(12) United States Patent
Xu et al.

(10) Patent No.: US 10,421,888 B2
(45) Date of Patent: Sep. 24, 2019

(54) METHOD FOR MANUFACTURING TOUCH PANEL AND CONDUCTIVE STRIPPABLE ADHESIVE

(71) Applicants: BOE Technology Group Co., Ltd., Beijing (CN); Hefei Xinsheng Optoelectronics Technology Co., Ltd., Anhui (CN)

(72) Inventors: Shifeng Xu, Beijing (CN); Ming Hu, Beijing (CN); Ming Zhang, Beijing (CN)

(73) Assignees: BOE Technology Group Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 64 days.

(21) Appl. No.: 15/553,750

(22) PCT Filed: Apr. 1, 2017

(86) PCT No.: PCT/CN2017/079314
§ 371 (c)(1),
(2) Date: Aug. 25, 2017

(87) PCT Pub. No.: WO2018/036163
PCT Pub. Date: Mar. 1, 2018

(65) Prior Publication Data
US 2018/0237666 A1    Aug. 23, 2018

(30) Foreign Application Priority Data
Aug. 25, 2016   (CN) .......................... 2016 1 0729747

(51) Int. Cl.
*C09J 131/04* (2006.01)
*C09J 9/02* (2006.01)
(Continued)

(52) U.S. Cl.
CPC ............... *C09J 131/04* (2013.01); *C09J 9/00* (2013.01); *C09J 9/02* (2013.01); *C09J 11/04* (2013.01);
(Continued)

(58) Field of Classification Search
CPC . C09J 11/04; C09J 11/06; C09J 127/06; C09J 131/04; C09J 161/06; C09J 201/00;
(Continued)

(56) References Cited

U.S. PATENT DOCUMENTS

2012/0315475 A1    12/2012   Fung et al.
2014/0231292 A1*   8/2014    Miyachika ............ A61F 15/001
                                                                    206/440
(Continued)

FOREIGN PATENT DOCUMENTS

CN    101989134 A    3/2011
CN    102807785 A    12/2012
(Continued)

OTHER PUBLICATIONS

Jun. 2, 2017—(WO) International Search Report and Written Opinion Appn PCT/CN2017/079314 English Tran.

*Primary Examiner* — Viet D Pham
(74) *Attorney, Agent, or Firm* — Banner & Witcoff, Ltd.

(57) ABSTRACT

A method for manufacturing a touch panel and a conductive strippable adhesive are provided. The method for manufacturing the touch panel including forming a touch electrode and forming a conductive strippable adhesive layer on the touch electrode, wherein the conductive strippable adhesive layer is electrically connected with the touch electrode. The conductive strippable adhesive layer enables charges to flow freely in the touch electrodes, so as to balance the electric potential in the touch electrodes, and improve the ability of resisting electrostatic breakdown of touch panel products in (Continued)

the production process, and effectively eliminate risk of ESD in a manufacturing process of a touch panel, and hence improve the product yield, and reduce the cost.

19 Claims, 5 Drawing Sheets

(51) Int. Cl.
| | |
|---|---|
| C09J 11/06 | (2006.01) |
| C09J 127/06 | (2006.01) |
| C09J 201/00 | (2006.01) |
| C09J 9/00 | (2006.01) |
| C09J 11/04 | (2006.01) |
| G06F 3/044 | (2006.01) |
| C08L 61/06 | (2006.01) |

(52) U.S. Cl.
CPC ............ *C09J 11/06* (2013.01); *C09J 127/06* (2013.01); *C09J 201/00* (2013.01); *G06F 3/044* (2013.01); *C08L 61/06* (2013.01); *G06F 2203/04103* (2013.01); *G06F 2203/04111* (2013.01)

(58) Field of Classification Search
CPC ..... C09J 9/00; C09J 9/02; G06F 2203/04103; G06F 2203/04111; G06F 3/044
See application file for complete search history.

(56) References Cited

U.S. PATENT DOCUMENTS

| | | | | |
|---|---|---|---|---|
| 2014/0251662 | A1* | 9/2014 | Rotto | ............... C09J 9/02 174/253 |
| 2014/0302293 | A1* | 10/2014 | Takano | ............... B32B 7/12 156/249 |
| 2015/0015979 | A1* | 1/2015 | Iwami | ............... H05K 9/0096 359/893 |
| 2015/0255633 | A1* | 9/2015 | Sukata | ............... H01L 31/048 136/256 |
| 2017/0190925 | A1* | 7/2017 | Wu | ............... C09D 5/00 |

FOREIGN PATENT DOCUMENTS

| | | |
|---|---|---|
| CN | 102827563 A | 12/2012 |
| CN | 102999204 A | 3/2013 |
| CN | 103923414 A | 7/2014 |
| CN | 106125993 A | 11/2016 |

\* cited by examiner

METHOD FOR MANUFACTURING TOUCH PANEL AND CONDUCTIVE STRIPPABLE ADHESIVE

The application is a U.S. National Phase Entry of International Application No. PCT/CN2017/079314 filed on Apr. 1, 2017, designated the United States of America and claiming priority to Chinese Patent Application No. 201610729747.X, filed in Aug. 25, 2016. The present application claims priority to and the benefit of the above-identified applications and the above-identified applications are incorporated by reference herein in their entirety.

TECHNICAL FIELD

At least one embodiment of the present disclosure relates to a method for manufacturing a touch panel and a conductive strippable adhesive.

BACKGROUND

In the production and use process of a touch panel, wirings, bridge points and even an in-plane functional area of the touch panel tend to be subjected to breakdown due to electrostatic accumulation, so the touch function of the touch panel can be disabled, and hence the product yield can be reduced and the consumer experience can be affected. In the structural design of a touch panel, annular ground wires are usually disposed at a periphery of a peripheral functional area of the touch panel, connected to an outer frame through an IC, and finally accessed to the earth through power lines.

SUMMARY

At least one embodiment of the present disclosure relates to a method for manufacturing a touch panel and a conductive strippable adhesive, which improve the ability of resisting electrostatic breakdown of touch panel products in the production process and hence improve the product yield.

At least one embodiment of the present disclosure provides a method for manufacturing a touch panel, including forming a touch electrode and forming a conductive strippable adhesive layer on the touch electrode, wherein the conductive strippable adhesive layer is electrically connected with the touch electrode.

At least one embodiment of the present disclosure further provides a conductive strippable adhesive, prepared by the following raw materials in parts by weight: poly(vinyl chloride-vinyl acetate): 60-65 parts; conductive polymeric materials: 10-12 parts; A-stage phenolic resin: 8-10 parts; phthalic acid ester: 8-10 parts; stabilizer: 2-5 parts; filler: 2-4 parts; colorant: 0.5-1 parts.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

Figure 1A:
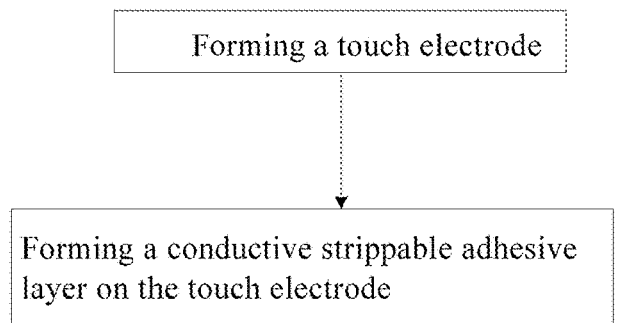
FIG 1a is a flow diagram of a method for manufacturing a touch panel, provided by an embodiment of the present disclosure.

REFERENCE NUMERALS 10-touch electrode; 20-conductive strippable adhesive layer; 201-hollowed-out structure; 101-touch driving electrode; 102-touch sensing electrode; 1011-main part of touch driving electrode; 11-first insulating layer; 12-connecting part; 15-connecting wire; 16-second insulating layer; 19-dummy electrode.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In a manufacturing process of a touch panel, equipment will form a lot of static electricity, and large-area transparent conductive materials (e.g., indium tin oxide (ITO)) of the touch panel are easy to accumulate a lot of static charges. However, in the manufacturing process of the touch panel, a touch IC is not bonded yet. At this point, a driving electrode (Tx) channel and, a sensing electrode (Rx) channel and a dummy electrode area are all in a floating state; static electricity accumulated in the actual production process cannot be led into the earth through the IC and cannot be released in time, resulting in electrostatic breakdown damage and the rejection loss of a large number of products. For instance, when the electric potential difference between different touch electrode (e.g., ITO) channels is large due to different amounts of accumulated static electricity, adjacent channels can be easily subjected to electrostatic breakdown, so that short circuit can be caused, and hence the touch function of the touch panel can be disabled. Therefore, an effective electrostatic discharge method is required.

Figure 1B:
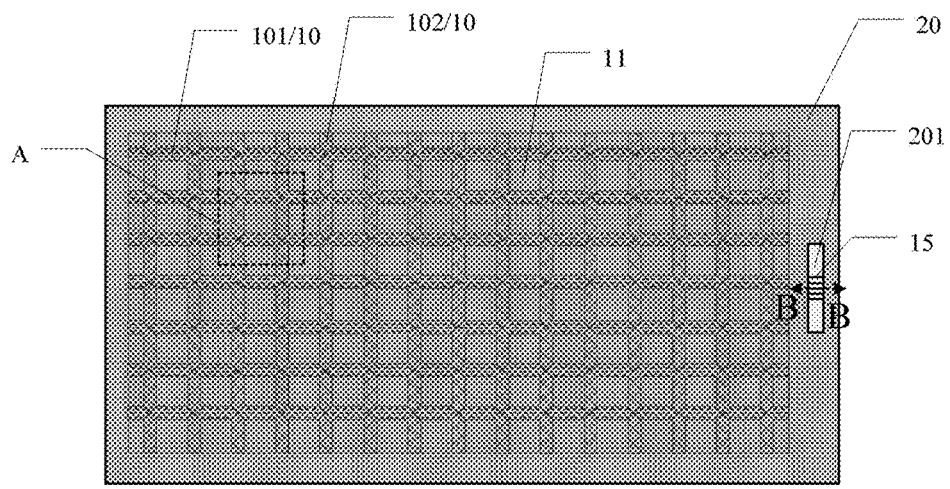
FIG 1b is a schematic diagram of a method for manufacturing a touch panel, provided by an embodiment of the present disclosure.

As illustrated in FIGS. 1a and 1b, at least one embodiment of the present disclosure provides a method for manufacturing a touch panel, which includes forming a touch electrode 10 and forming a conductive strippable adhesive layer 20 on the touch electrode 10. The conductive strippable adhesive layer 20 is electrically connected with the touch electrodes 10.

The conventional strippable adhesive is insulating material. The embodiment of the present disclosure adopts a conductive strippable adhesive material. Due to the conductive strippable adhesive layer, charges can flow freely in the touch electrode 10, so as to balance the electric potential in the touch electrode 10. Therefore, the embodiment can improve the ability of resisting electrostatic breakdown of touch panel products in the manufacturing process, effectively eliminate the risk of electrostatic discharge (ESD) in the manufacturing process of the touch panel, greatly improve the product yield, and reduce the cost.

Figure 2:
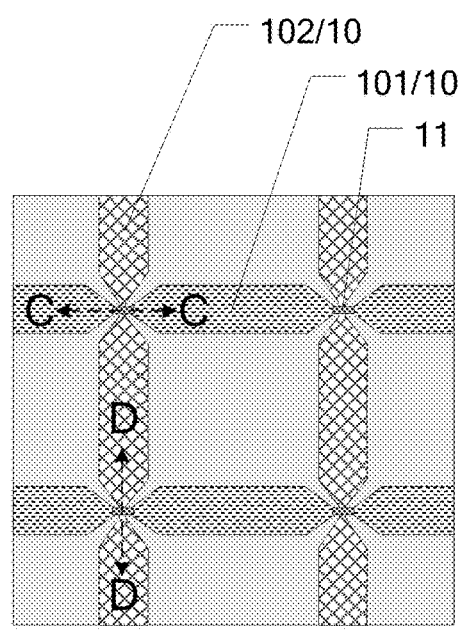
FIG. 2 is an enlarged view of A in FIG. 1b.
Figure 3A:
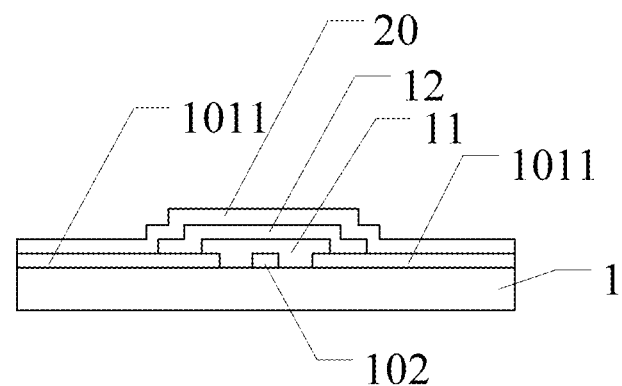
FIG. 3a is a sectional view along line CC in FIG. 2.
Figure 3B:
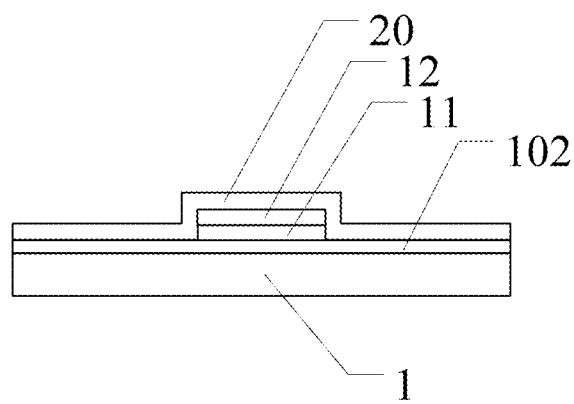
FIG. 3b is a sectional view along line DD in FIG. 2.

As illustrated in FIG. 1b, the touch electrode 10 includes a plurality of touch driving electrodes 101 and a plurality of touch sensing electrodes 102. The plurality of touch driving electrodes 101 and the plurality of touch sensing electrodes 102 are insulated from each other. FIG. 2 is an enlarged view of A in FIG 1b. FIGS. 3a and 3b are respectively a sectional view along line CC and DD in FIG. 2. Due to the conductive strippable adhesive layer, the plurality of touch driving electrodes 101 and the plurality of touch sensing electrodes 102 can be electrically connected with each other, and the charges can flow freely through the conductive strippable adhesive layer, so that the electric potential between the channels (Tx channels and Rx channels) can be consistent. Therefore, the electrostatic breakdown damage between the channels can be avoided, and the product yield can be greatly improved. It should be noted that the touch driving electrode 101 and the touch sensing electrode 102 can be exchangeable.

As illustrated in FIG. 3a, main parts 1011 of the touch driving electrodes and the touch sensing electrodes 102, disposed on a base substrate 1, can be patterned by conductive materials in the same layer (e.g., transparent conductive materials); a first insulating layer 11 is disposed on the main parts 1011 of the touch driving electrodes and the touch sensing electrodes 102; a connecting part 12 is disposed on the first insulating layer 11; and main parts 1011 of two adjacent touch driving electrodes are electrically connected with each other through the connecting part 12. The connecting part 12 is made from a conductive material. The material of the connecting part 12, for instance, includes but not limited to metal and ITO. The material of the main parts 1011 of the touch driving electrodes and the touch sensing electrodes 102, for instance, include but not limited to ITO. The material of the first insulating layer 11, for instance, include but not limited to optically clear adhesive (OCA).

For instance, as illustrated in FIGS. 3a and 3b, the conductive strippable adhesive layer 20 is in contact with the touch driving electrodes 101 and the touch sensing electrodes 102 (the touch electrode 10).

Figure 4:
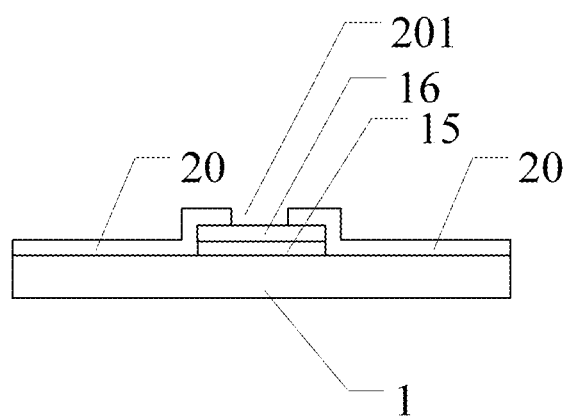
FIG. 4 is a sectional view along line BB in FIG 1b.

For instance, as illustrated in FIGS. 1b and 4, before forming the conductive strippable adhesive layer 10, the method further includes forming a connecting wire 15 on the base substrate 1 and forming a second insulating layer 16 on the connecting wire 15. The conductive strippable adhesive layer 20 has a hollowed-out structure 201 in a bonding area. After forming the conductive strippable adhesive layer 20, the insulating layer is etched in the bonding area to expose the connecting wire 15 in the bonding area. An area on the base substrate 1, corresponding to the hollowed-out structure 201, can be the bonding area. For instance, the material of the second insulating layer 16 includes but not limited to OCA. The second insulating layer 16 and the first insulating layer can be formed in the same layer or different layers. The material of the connecting wire 15, for instance, includes metal. A driver IC can be bonded to the connecting wire 15. FIG 1b illustrates five connecting wires 15. The connecting wirers 15 can also adopt other numbers. No limitation will be given here in the embodiment of the present disclosure.

Figure 5:
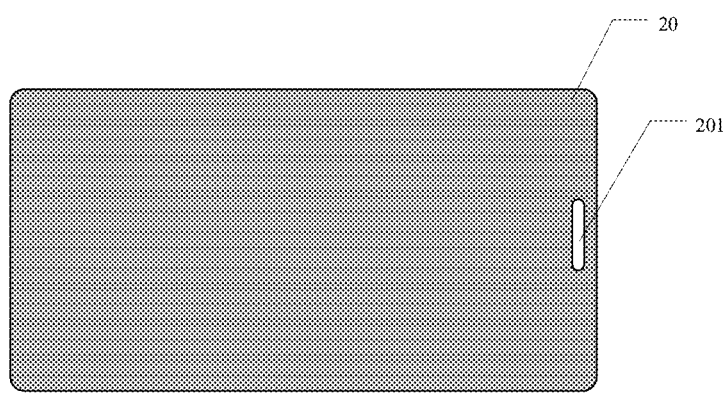
FIG. 5 is a schematic diagram of a conductive strippable adhesive layer corresponding to a single touch panel in a method for manufacturing a touch panel provided by an embodiment of the present disclosure.

For instance, in the screen drawing design of the conductive strippable adhesive layer, for the convenience of stripping off the conductive strippable adhesive, as illustrated in FIG. 5, four corners of the conductive strippable adhesive layer are subjected to rounding-off treatment. For instance, the rounding-off radius can be 0.5 mm The rounding-off radius can also adopt other values.

Figure 6:
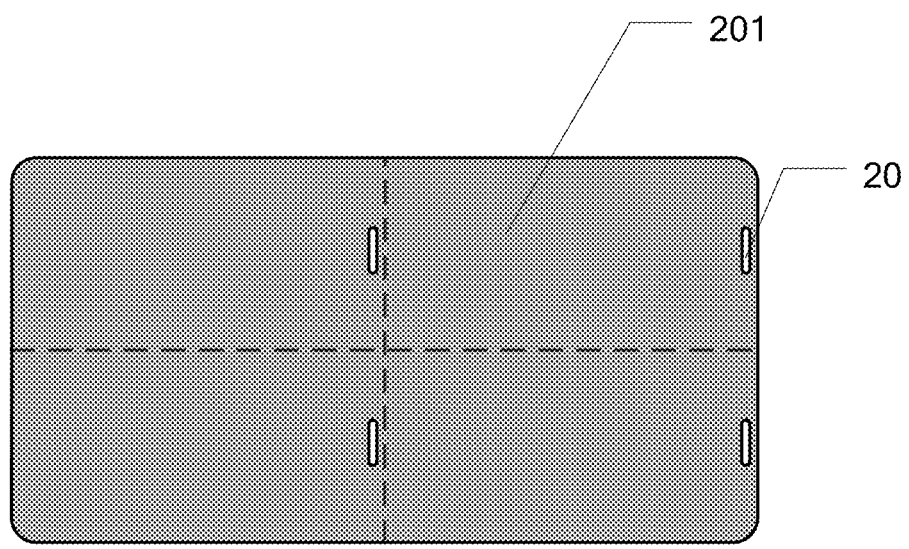
FIG. 6 is a schematic diagram of a conductive strippable adhesive layer corresponding to a Q-panel in a method for manufacturing a touch panel provided by one embodiment of the present disclosure.

Description is given in FIGS. 1-5 by taking one touch panel as an example. In general, as illustrated in FIG. 6, a conductive strippable adhesive layer can be formed on a Q-panel. FIG. 6 shows a Q-panel including 4 touch panels. It should be noted that the Q-panel can also include touch panels of other numbers. No limitation will be given here in the embodiment of the present disclosure.

Figure 7:
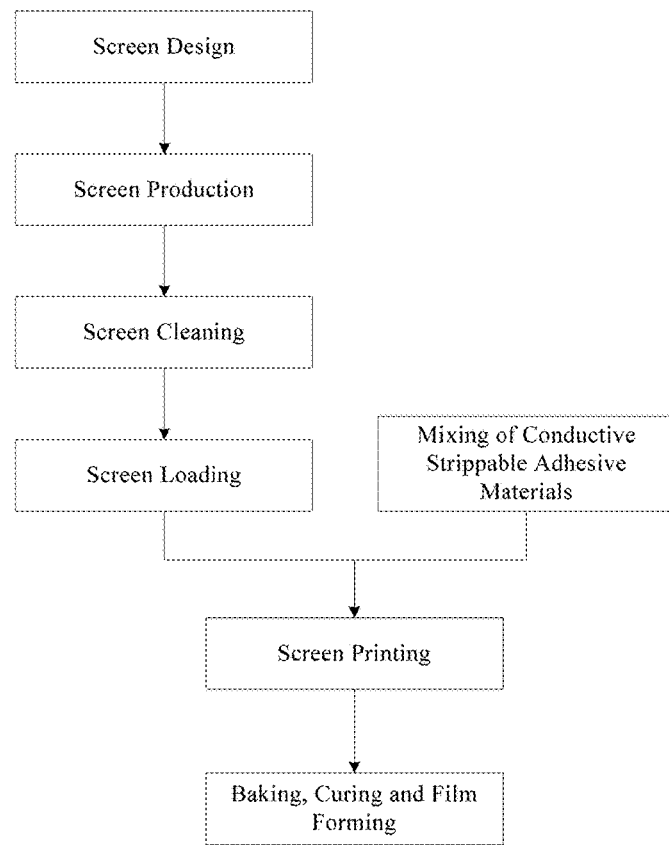
FIG. 7 is a flow diagram illustrating a process of forming the conductive strippable adhesive layer in a method for manufacturing a touch panel provided by an embodiment of the present disclosure.

For instance, as illustrated in FIG. 7, the conductive strippable adhesive layer can be formed by a screen printing process. Forming the conductive strippable adhesive layer, for instance, includes screen design, screen production, screen cleaning, screen loading, mixing of conductive strippable adhesive materials, screen printing, and baking, curing and film forming.

Figure 8:
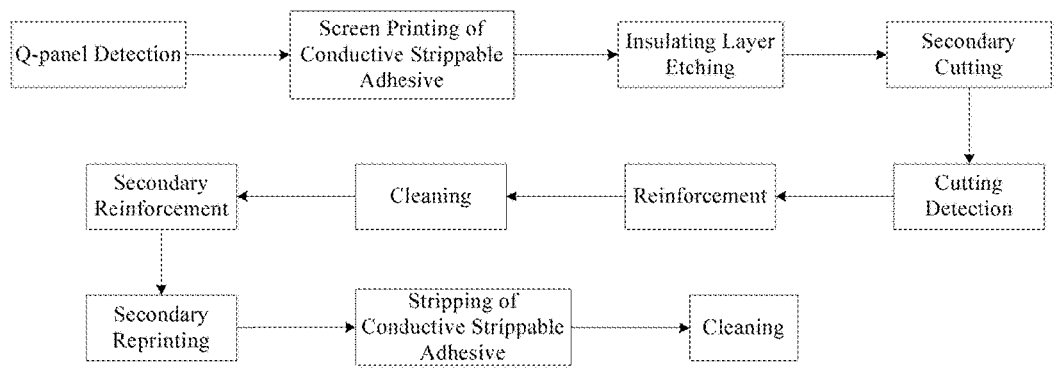
FIG. 8 is a schematic diagram illustrating a subsequent process performed under protection of a conductive strippable adhesive layer in a method for manufacturing a touch panel provided by an embodiment of the present disclosure.

For instance, as illustrated in FIG. 8, after the Q-panel detection is qualified, a conductive strippable adhesive can be formed by a screen printing process. The conductive strippable adhesive layer can have the functions of moisture proofing and protection and have the function of preventing materials such as the touch electrode from being contaminated or scratched in a subsequent production process. The Q-panel detection, for instance, includes capacitance detection. A subsequent process can be performed under the protection of the conductive strippable adhesive layer. After completion of the subsequent process, the conductive strippable adhesive layer is stripped off. For instance, the subsequent process includes insulating layer etching, secondary cutting (cutting the Q-panel into single touch panels), cutting detection (for instance, including the detection of the capacitance of each pixel), reinforcement (for instance, including rounding-off, grinding and the like to improve the intensity), cleaning, secondary reinforcement (for instance, including polishing to improve the intensity), secondary reprinting (for instance, including peripheral metal wiring reprinting, black matrix reprinting, etc.), stripping of conductive strippable adhesive, cleaning, etc. The process of stripping off the conductive strippable adhesive, for instance, can be that: one side of the conductive strippable adhesive is stripped off at first and then the entire conductive strippable adhesive is stripped off.

Figure 9:
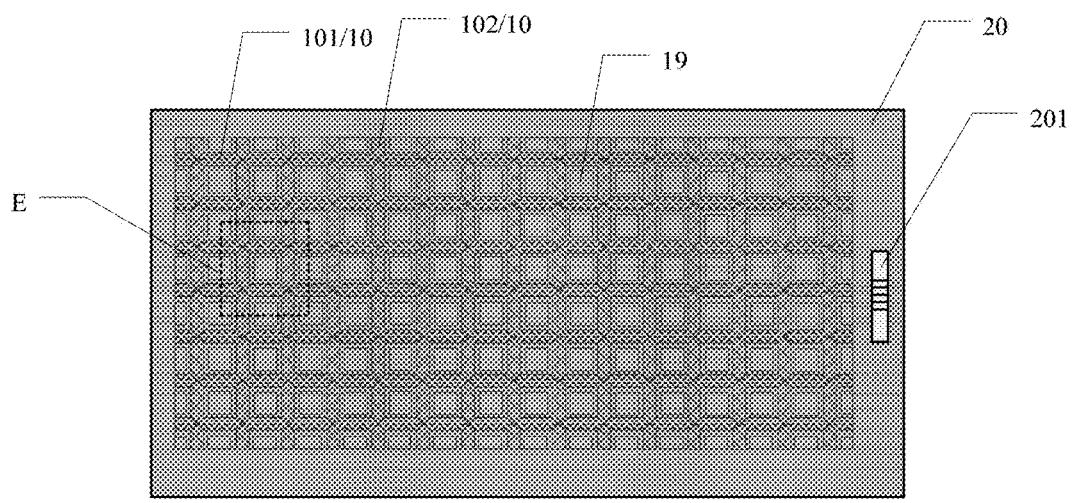
FIG. 9 is a schematic diagram of a method for manufacturing a touch panel, including dummy electrodes, provided by an embodiment of the present disclosure.
Figure 10:
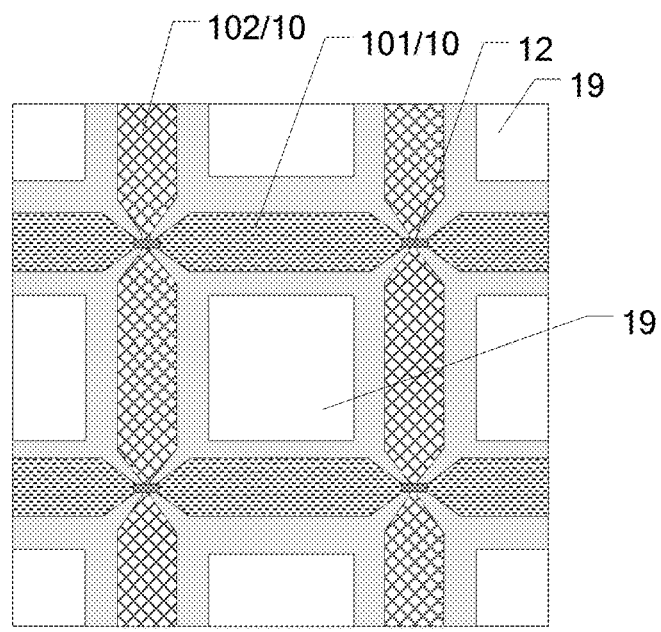
FIG. 10 is an enlarged view of E in FIG. 9.

For instance, as illustrated in FIGS. 9 and 10, the touch panel can further include a plurality of dummy electrodes 19. The plurality of dummy electrodes 19 and the plurality of touch driving electrodes 101 are insulated from each other; the plurality of dummy electrodes 19 and the plurality of touch sensing electrodes 102 are insulated from each other; and the conductive strippable adhesive layer 20 is also electrically connected with the plurality of dummy electrodes 19. Thus, the Tx channels, the Rx channels and the dummy electrodes of the touch panel can be always in the same electric potential. Therefore, the embodiment reduces the risk of electrostatic breakdown as the electric potential difference is increased due to electrostatic accumulation in the manufacturing process, and improves the ability of resisting electrostatic breakdown of touch panel products in the manufacturing process, and hence improves the product yield. The dummy electrodes 19 are not applied with signals. The arrangement of the dummy electrodes 19 can improve the touch effect of the touch panel. For instance, the plurality of dummy electrodes 19 can be formed in the same layer with the main parts 1011 of the touch driving electrodes and the touch sensing electrodes 102. For instance, the conductive strippable adhesive layer 20 can also be in contact with the plurality of dummy electrodes 19.

For the convenience of description, the first insulating layer and the second insulating layer in FIGS. 1b, 2, 9 and 10 are subjected to transparent processing, and the conductive strippable adhesive layer is subjected to semitransparent processing.

For instance, the method for manufacturing the touch panel, provided by at least one embodiment of the present disclosure, can be used for manufacturing a one glass solution (OGS) mode touch panel and can also be used for manufacturing an on-cell mode touch panel.

It should be noted that the structure of the touch electrodes is not limited to that as illustrated in the figure. For instance, the touch electrodes can only include the touch driving electrodes or only include the touch sensing electrodes, or can also be a single-layer self-capacitive electrode. No limitation will be given here in the embodiment of the present disclosure.

At least one embodiment of the present disclosure further provides a conductive strippable adhesive, which is prepared by the following raw materials in parts by weight: poly(vinyl chloride-vinyl acetate): 60-65 parts; conductive polymeric materials: 10-12 parts; A-stage phenolic resin: 8-10 parts; phthalic acid ester: 8-10 parts; stabilizer: 2-5 parts; filler: 2-4 parts; colorant: 0.5-1 parts.

For instance, the stabilizer includes barium stearate and triphenyl phosphate; the filler includes calcium carbonate and silicon dioxide; and the colorant includes phthalocyanine blue.

For instance, in one embodiment, the conductive strippable adhesive can be prepared by the following raw materials in parts by weight: poly(vinyl chloride-vinyl acetate): 60-65 parts; conductive polymeric materials: 10-12 parts; A-stage phenolic resin: 8-10 parts; phthalic acid ester: 8-10 parts; barium stearate: 1-2 parts; triphenyl phosphate: 1-3 parts; calcium carbonate: 1-2 parts; silicon dioxide: 1-2 parts; phthalocyanine blue: 0.5-1 parts.

For instance, the conductive polymeric material includes a fill-type conductive polymeric material. The fill-type conductive polymeric material includes a fill-type conductive epoxy resin. For instance, the fill-type conductive epoxy resin includes carbon or silver-filled conductive epoxy resin.

For instance, the fill-type conductive polymeric material added in the conductive strippable adhesive can be changed to a structural type conductive polymeric material or a blending composite type conductive polymeric material in composite conductive polymeric material. The conductive strippable adhesive can also include a variety selected from a group consisting of the fill-type conductive polymeric materials, the structural type conductive polymeric material and the blending composite type conductive polymeric material.

For instance, other materials can also be added into the conductive strippable adhesive. No limitation will be given here in the embodiment of the present disclosure.

For instance, the conductive strippable adhesive provided by the embodiment of the present disclosure can be subjected to screen printing and baking, curing and film forming to obtain the conductive strippable adhesive layer 20 in any embodiment of the present disclosure.

It should be noted that the conductive strippable adhesive layer can be formed by the conductive strippable adhesive provided by the embodiment of the present disclosure, but not limited to the material. The conductive strippable adhesive layer can also be formed by other suitable materials. The method for manufacturing the touch panel, provided by the embodiment of the present disclosure, does not limit the structure of the touch electrode.

The following is to be noted.

(1) The same reference numerals denote the same elements/components unless otherwise defined.

(2) In the drawings of the present disclosure, only the structures related to the embodiments of the present disclosure are involved, other structures can refer to usual designs.

(3) In order to clearly illustrate, a layer or an area may be amplified in the drawings of the embodiments of the present disclosure. It is to be understood that, when a member such as a layer, a film, an area or a substrate is located or disposed on or below another member, the member can be located or disposed on or below the another member directly, or an intermediate member or intermediate member(s) can be disposed.

(4) The features in different embodiments or different features in the same embodiments can be combined without conflict.

It should be noted that all the accompanying drawings of the present disclosure are brief schematic diagrams of the array substrate and the manufacturing method thereof and are only intended to clearly describe the proposal and embody the structures relevant to the disclosure, and other structures irrelevant to the disclosure are the conventional structures and not embodied in the accompanying drawings or only parts are embodied.

This application claims the benefit of priority from Chinese patent application No. 201610729747.X, filed on Aug. 25, 2016, the disclosure of which is incorporated herein in its entirety by reference as a part of the present application.

What is claimed is:

1. A method for manufacturing a touch panel, comprising:
forming a touch electrode, wherein touch electrode comprises a plurality of touch driving electrodes and a plurality of touch sensing electrodes, and wherein the plurality of touch driving electrodes are insulated from the plurality of touch sensing electrodes; and
forming a conductive strippable adhesive layer on the touch electrode, wherein the conductive strippable adhesive layer is electrically connected with the touch electrode, and wherein the conductive strippable adhesive layer is electrically connected with the plurality of touch driving electrodes and the plurality of touch sensing electrodes to allow the plurality of touch driving electrodes and the plurality of touch sensing electrodes to have a same electric potential.

2. The method for manufacturing the touch panel according to claim 1, wherein the conductive strippable adhesive layer is in contact with both of the plurality of touch driving electrodes and the plurality of touch sensing electrodes.

3. A method for manufacturing a touch panel, comprising forming a touch electrode and forming a conductive strippable adhesive layer on the touch electrode, wherein the conductive strippable adhesive layer is electrically connected with the touch electrode,
wherein before forming the conductive strippable adhesive layer, the method further comprises forming a connecting wire and forming an insulating layer on the connecting wire, wherein the conductive strippable adhesive layer has a hollowed-out structure in a bonding area; and after forming the conductive strippable adhesive layer, the insulating layer is etched in the bonding area to expose the connecting wire in the bonding area.

4. The method for manufacturing the touch panel according to claim 1, further comprising a plurality of dummy electrodes, wherein, before forming the conductive strippable adhesive layer on the touch electrode, the plurality of dummy electrodes and the plurality of touch driving electrodes are insulated from each other; the plurality of dummy electrodes and the plurality of touch sensing electrodes are insulated from each other; and upon forming the conductive strippable adhesive layer on the touch electrode, the conductive strippable adhesive layer is also electrically connected with the plurality of dummy electrodes to allow the plurality of touch driving electrodes, the plurality of touch sensing electrodes, and the plurality of dummy electrodes to have a same electric potential.

5. The method for manufacturing the touch panel according to claim 4, wherein the conductive strippable adhesive layer is in contact with the plurality of dummy electrodes, the plurality of touch driving electrodes, and the plurality of touch sensing electrodes.

6. The method for manufacturing the touch panel according to claim 1, wherein the conductive strippable adhesive layer has four rounded corners.

7. The method for manufacturing the touch panel according to claim 1, further comprising performing a subsequent process under protection of the conductive strippable adhesive layer; and striping off the conductive strippable adhesive layer after completion of the subsequent process.

8. The method for manufacturing the touch panel according to claim 7, wherein the subsequent process comprises at least one selected from the group consisting of cutting, cleaning, grinding, polishing, and reprinting.

9. The method for manufacturing the touch panel according to claim 7, wherein the stripping off the conductive strippable adhesive layer comprises: stripping off one side of the conductive strippable adhesive at first, and then stripping off an entirety of the conductive strippable adhesive.

10. The method for manufacturing the touch panel according to claim 1, wherein the conductive strippable adhesive layer is formed by a screen printing process.

11. The method for manufacturing the touch panel according to claim 1, wherein the conductive strippable adhesive layer comprises at least one selected from the group consisting of a fill-type conductive polymeric material, a structural type conductive polymeric material, and a blending composite type conductive polymeric material.

12. The method for manufacturing the touch panel according to claim 1, wherein the conductive strippable adhesive layer comprises the following raw materials in parts by weight:
poly(vinyl chloride-vinyl acetate): 60-65 parts; conductive polymeric material: 10-12parts; A-stage phenolic resin: 8-10 parts; phthalic acid ester: 8-10 parts; stabilizer: 2-5 parts; filler: 2-4 parts; and colorant: 0.5-1 parts.

13. The method for manufacturing the touch panel according to claim 12, wherein the conductive polymeric material comprises at least one selected from the group consisting of a fill-type conductive polymeric material, a structural type conductive polymeric material, and a blending composite type conductive polymeric material.

14. The method for manufacturing the touch panel according to claim 3, wherein the touch electrode comprises a plurality of touch driving electrodes and a plurality of touch sensing electrodes; and before forming the conductive strippable adhesive layer on the touch electrode, the plurality of touch driving electrodes and the plurality of touch sensing electrodes are insulated from each other.

15. The method for manufacturing the touch panel according to claim 14, further comprising performing a subsequent process under protection of the conductive strippable adhesive layer; and stripping off the conductive strippable adhesive layer after completion of the subsequent process.

16. The method for manufacturing the touch panel according to claim 15, wherein the stripping off the conductive strippable adhesive layer comprises: stripping off one side of the conductive strippable adhesive is at first, and then stripping off an entirety of the conductive strippable adhesive.

17. A conductive strippable adhesive, comprising the following raw materials in parts by weight:
poly(vinyl chloride-vinyl acetate): 60-65 parts; conductive polymeric materials: 10-12parts; A-stage phenolic resin: 8-10 parts; phthalic acid ester: 8-10 parts; stabilizer: 2-5 parts; filler: 2-4 parts; and colorant: 0.5-1 parts.

18. The conductive strippable adhesive according to claim 17, wherein the conductive polymeric materials comprise at least one selected from the group consisting of a fill-type conductive polymeric material, a structural type conductive polymeric material, and a blending composite type conductive polymeric material.

19. The conductive strippable adhesive according to claim 17, wherein the stabilizer comprises barium stearate and triphenyl phosphate; the filler comprises calcium carbonate and silicon dioxide; and the colorant comprises phthalocyanine blue.

* * * * *